May 8, 1945.  O. BERNHARD  2,375,184

TRACTOR

Filed Feb. 3, 1944  2 Sheets-Sheet 1

INVENTOR.
Otto BERNHARD
BY
ATTORNEY

May 8, 1945.  O. BERNHARD  2,375,184
TRACTOR
Filed Feb. 3, 1944   2 Sheets-Sheet 2

INVENTOR.
Otto BERNHARD
BY
ATTORNEY

UNITED STATES PATENT OFFICE 2,375,184

TRACTOR

Otto Bernhard, New Rochelle, N. Y.

Application February 3, 1944, Serial No. 520,915
In Great Britain December 29, 1942

9 Claims. (Cl. 180—70)

This invention relates to engine driven tractors for agricultural or industrial purposes, earth moving, etc., and is especially valuable for wheeled tractors equipped with large section pneumatic tires.

It is a primary object of this invention to provide for a tractor drive which alternatively supplies to the tractor low speed, say of 2.5 miles per hour or less, for slow and heavy work such as plowing, earth moving, or other operations, and high speed, such as 30 miles per hour or more, for travel over normal road surfaces.

More specifically, it is an object of this invention to separate the rear wheel axle from the differential shaft and to arrange between both a transmission gear adapted to reduce the high velocity for travel to low tractor speed for work.

A transmission mechanism will thus result which comprises a primary or velocity stage and a secondary or transmission stage. The velocity stage includes clutch, change speed gearing, propeller shaft, differential gear, all of suitable types or of types similar to or conventional in car or truck drives. In this stage of the mechanism, disregarding the various speed changes obtainable in and by means of the gear box, the engine velocity may be reduced by means of the differential gear in the ratio 6:1 and this lower velocity may then be transmitted without further or without substantial reduction by means of the secondary or transmission mechanism of my invention to the rear wheel axle for travel speed on roads.

For heavy work, the velocity which is supplied from the engine through the primary stage of the mechanism to the differential shaft will then be further reduced in the secondary stage of the transmission mechanism, for instance in the ratio 12:1.

Improved mechanical conditions for the structure and operation of the tractor will result from this arrangement. Even if the tractor is operated at low speed under heavy conditions, such as plowing or earth moving, the differential may be driven directly from the engine, and the variable transmission ratios which are at the driver's disposal in the change speed gear of the gear box may then be utilized for transitory changes of the basic working velocity.

Accordingly, the elements in the rear of the gear box, namely universal or Cardan joint, Cardan shaft, differential and differential shaft, i. e., axle driven by the differential, will transmit the driving power to the secondary stage with a smaller torque and at a higher velocity than those which would prevail if the lower speed ratios of the gear box were used.

Lighter construction of the tractor on the one hand will thus be possible and well balanced working conditions for the tractor and the engine, especially, will be obtained on the other hand. An engine of high velocity up to 2800 revolutions per minute or even more may thus be used as a tractor drive and the favorable working conditions of such a high speed engine may be utilized for the tractor.

The secondary stage of the transmission mechanism which is disposed between the differential shaft and the rear wheel axle and in proximity thereto is built for great torque and will thus easily take up the high strain or stress of severe working conditions without undue stress to other parts of the tractor.

The secondary stage of the transmission of my invention includes a driving axle—the axle driven by the differential—which is located in front of the rear wheel axle and in spaced relation thereto. This mechanism further includes a secondary transmission arranged between, and in driven and driving connection respectively to, the driving axle and the rear wheel axle. This secondary transmission may be adapted in various ways for variable transmission ratio in order to supply alternatively high speed for travel and low speed for work. The secondary transmission may include elements which are removable and exchangeable against others for supplying to the tractor speed ranges between high travel speed and low working speed. A pair of removable and reversibly interchangeable elements, such as a pair of chain wheels or sprockets may be included in the secondary transmission or may constitute the secondary transmission for thus supplying two alternative transmission ratios, one ratio for slow working speed and the other ratio for high travel speed.

The secondary transmission may be composed of two pairs of elements or transmission components one of them being variable and the other fixed. I may subdivide, for instance, the transmission ratio of 12.25:1, as specified above, into two steps each of a ratio of 3.5:1.

The gear ratio of the secondary gearing will then be (1)  $3.5:1 \times 3.5:1 = 12.25:1$ and if the elements of the first gear couple are reversed or interchanged (2)  $1:3.5 \times 3.5:1 = 1:1$ The total gear ratios will thus be (1a)  $6:1 \times 3.5:1 \times 3.5:1 = 73.5:1$ for heavy work, and (2a)  $6:1 \times 1:3.5 \times 3.5:1 = 6:1$ for travel on the road.

It will be appreciated that in addition to the alternative ratios provided for by the secondary transmission of the present invention, the full scope of the accelerator pedal or lever is available in all the main gear box ratios, and although it will be preferable to use the direct drive through the main gear box for plowing or other heavy work, it will be understood that the lower ratios or even a higher ratio are available if so desired.

Customarily agricultural tractors have unsprung axles, and their engine, clutch, gear box, and rear axle are housed in, or carried by, a large cast iron casing sufficiently robust to withstand the stresses when the tractor is doing heavy work. This leads to the disadvantage that through this rigid construction the maximum speed at which the tractor may be driven along normal road surfaces is severely limited. Since the tractor transmission mechanism is subdivided into two stages, in accordance with this invention, of which stages the first, from the engine to the differential inclusive, transmits the power at high velocity and with relatively small torque irrespectively of whether the tractor is travelling at high speed or is doing heavy work at low speed, I may now disrupt this rigidity and introduce yielding elements into the first stage of the mechanism and between the second stage of the mechanism and the frame. In this way any heavy stress, even under severe working conditions, may be kept from the more vulnerable parts of the drive such as the engine.

To accomplish this object, in accordance with a further development of my invention, I may provide a universal joint between gear box and propeller shaft as customary in car and tractor drives and may furthermore insert springs between rear wheel axle and frame. In a preferred embodiment of this feature of my invention I provide a tie generally of V-form having at its head and at its legs ball pivots to be mounted respectively at a cross member of the frame which houses the universal joint and at a casing which houses the rear wheel axle.

It is to be understood that when in this specification and the claims the term "axle" is used, this term is to comprise the member on which the wheel or other rotating element is mounted irrespectively of whether the wheel or other rotating element turns with the axle or about the axle and whether the axle is of one piece extended from one side of the tractor to the other, from wheel or other element to wheel or other element, or whether the member consists of two separate pieces one for each wheel or other rotating element.

Another object of this invention is the provision of means at the rear wheel axle for locking the differential and the tractor wheels driven thereby for thus causing the wheels to rotate in unison when so required, for instance when a field is to be plowed, or other heavy cross country work is to be done, or the tractor is to be moved over wet soil, etc.

Still another object of this invention relates to means for mounting the removable and exchangeable or reversibly interchangeable transmission elements on their shafts and to the application of an implement for interchanging the position of the transmission elements relatively to their shafts.

Other objects of the invention will in part become obvious and will in part appear hereinafter as the specification proceeds.

An embodiment of a tractor in accordance with the invention will be set forth in this specification as it proceeds and will be illustrated in part diagrammatically in and by the accompanying drawings which are to be understood explicative of the invention and not limitative of its scope. Other embodiments incorporating the principles underlying my invention are feasible without departing from the spirit and ambit of my appended claims.

Figure 1:
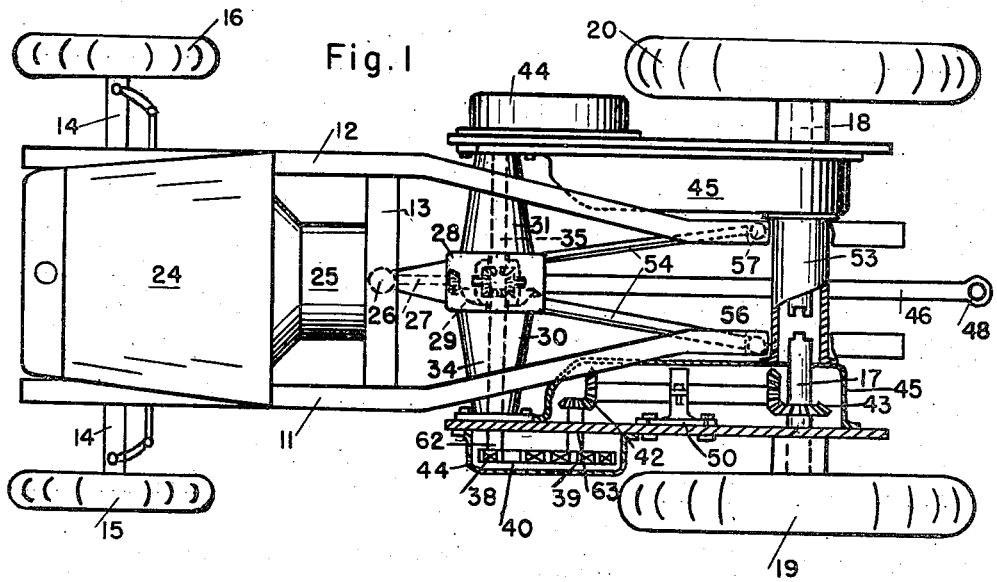
Fig. 1 is a plan view, partly in section, of a tractor of my invention.
Figure 2:
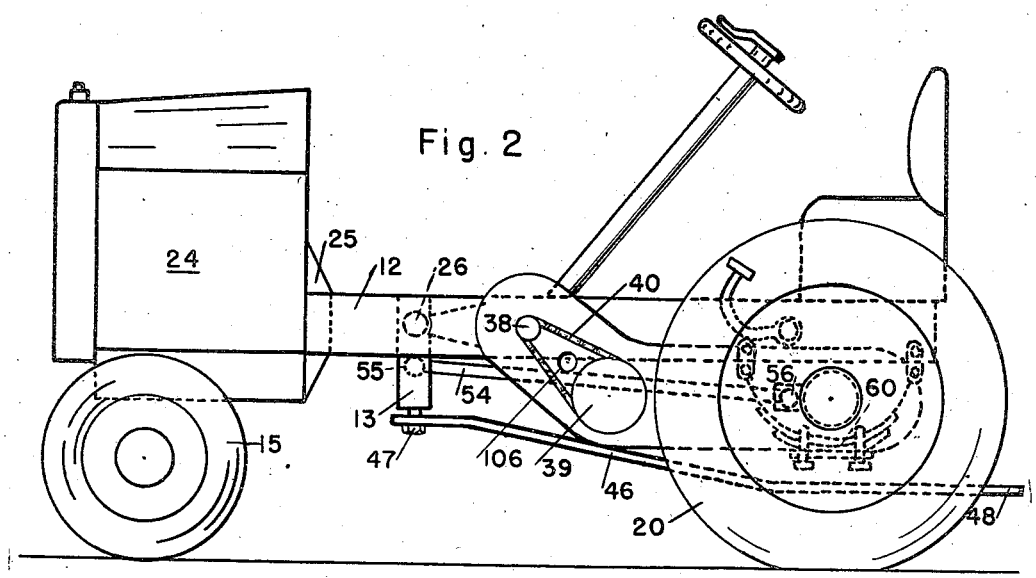
Fig. 2 is a side elevation of this tractor.

The frame of the tractor is composed of two longitudinal beams 11 and 12 and a cross member 13. The frame is supported by the front wheel axle 14 with front wheels 15 and 16, and the rear wheel axle 17, 18 with rear wheels 19 and 20.

The frame carries the engine 24, a casing 25 containing clutch and change speed gearing which may be of any conventional types as well known in the art and therefore not shown on the drawings, a universal joint 26 housed within cross member 13, propeller shaft 27, differential casing 28 housing differential gear, diagrammatically indicated at 29. Differential casing 28 has laterally extended drive shaft casings 30, 31 housing the drive axle or drive shafts 34, 35.

The transmission elements from clutch to differential or drive axle inclusive represent the primary or velocity stage of the transmission mechanism.

As the embodiment illustrates, the drive axle 34, 35 is located in front of the rear wheel axle 17, 18 and in spaced relation thereto.

Between drive axle 34, 35 and rear wheel axle 17, 18 there is arranged the secondary transmission which in the embodiment illustrated comprises a variable couple of transmission elements 38, 39 and a fixed gearing 42, 43 both encased in dust-proof and oil-tight covers 44 on both sides of the tractor.

As a matter of convenience the variable component consists of sprockets 38, 39 and chain 40. It will be readily understood however that any other type of transmission may be used instead thereof, and likewise any other type of gearing instead of the bevel gear 42, 43.

Since the variable transmission component is conveniently accessible at the sides of the tractor, sprockets 38, 39 may easily be exchanged against others of any desired gear ratio. A preferred way of varying the gear ratio is to interchange the sprockets 38 and 39. In this way two widely differing speeds, or, when the gear box is used, speed ranges may be obtained for the tractor.

If, as in the example set forth above, the gear ratio of the differential is 6:1 (speed ratio) and the ratios of the gear components 38, 39 and 42, 43 are each 3.5:1, the velocity of the engine in the direct drive will then be reduced at the rear axle to 73.5:1.

By interchanging the sprockets 38 and 39 so that the larger sprocket 39 becomes the driver the velocity transmitted to the rear wheel axle is reduced only in the ratio 6:1 and the tractor is at once made suitable for relatively high speed transport over normal road surface or smooth hard ground.

Since, as set forth above, the primary stage of the transmission mechanism transmits the power at high velocity and with small torque and since low velocity and large torque prevail only in the secondary stage. i. e., between drive axle and rear wheel axle, the greater strain in this part of the tractor can easily be taken up by base plates 50 which carry the secondary gearing. The rigidity of the tractor construction between engine and rear wheel axle which up to now was imperative may in tractors of this invention now be interrupted and a universal joint 26 may be inserted as Fig. 1 illustrates.

Figure 3:
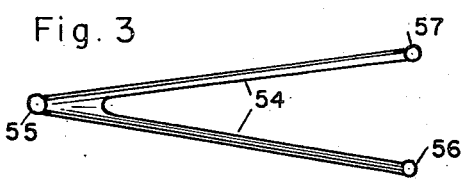
Fig. 3 is a plan view of a tie.

As indicated at 60, frame 11, 12 is spring-suspended upon rear wheel casing 53. In order to free these springs from the pull caused by the work performed, e. g., by the plow, a tie 54 generally of V-form, Fig. 3, is provided. This tie connects casing 53, which houses the rear wheel axle 17, 18, with cross member 13, which in its turn houses the universal joint. Tie 54 is provided at its head and at its legs with ball pivots 55 and 56 respectively mounted at cross member 13 and at casing 53.

The rear wheels of the tractor of this invention may thus carry the frame by spring suspension without any risk to the structure. The totally rigid and unyielding structure of a tractor which up to now was deemed indispensable may thus be abandoned in favor of a resilient structure.

The draught stresses instead of being applied, as up to now, to the rear of the tractor, may now be taken, due to my new and improved construction of a tractor, to a point between rear axle and front axle, for instance to the cross member 13. At this point link 46 which carries the draw bar hitch 48 may be mounted by means of pivot 47. In this way the distribution and reception of the forces and stresses is greatly improved.

Figure 4:
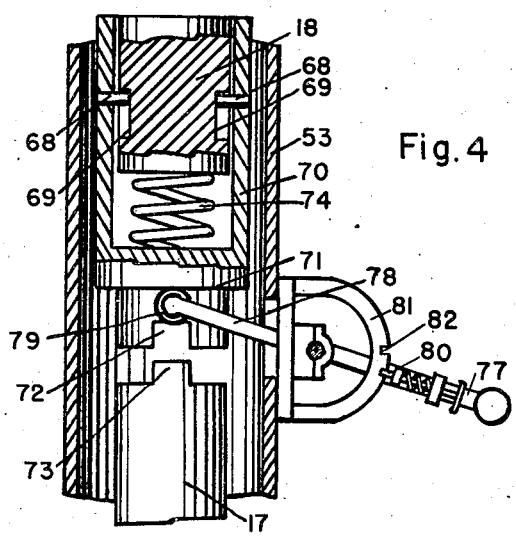
Fig. 4 shows, on an enlarged scale with respect to Fig. 1, a longitudinal section of a coupling or differential lock for the rear axle stubs.

Fig. 4 shows an embodiment of a differential lock. One of the rear axle stubs, 18, is provided with a sleeve 70 which by means of pin 68 and slot 69, for instance, is slidably connected with the rear axle stub 18. The face of the other axle stub 17 and the bottom 71 of the sleeve 70 are provided with tooth 73 and slot 72 urged to engagement under the tension of a spring 74, but, in the position illustrated on the drawings, held out of engagement by means of switch lever 77 with fork 78 and roller pair 79, pawl 80 and quadrant 81. When hand lever 77 is brought into position 82, the spring is free to bring slot 79 into engagement with tooth 73. Rear axle stubs 17 and 18 are now locked together and will turn in unison whilst the differential is rendered inoperative.

Figure 5:
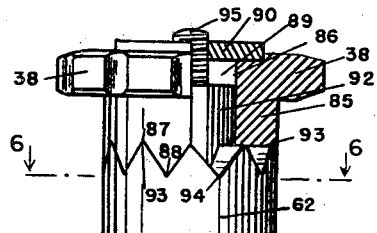
Fig. 5 illustrates, likewise on an enlarged scale, an elevation and partly a section along line 5—5 of Fig. 6, of a sprocket as exchangeable transmission element, its shaft, and its coupling.
Figure 6:
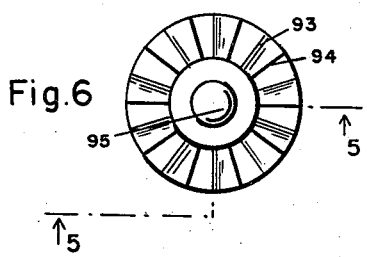
Fig. 6 is a top view of the gear element shaft of Fig. 5.

In order to facilitate the exchange or interchange of the transmission elements or sprockets, their hubs 85 may be mounted by means of bore 86 on a pin 92 of their shafts 62, 63, as Figs. 5 and 6 illustrate. The step between shafts 62, 63 and pin 92 of each shaft may be formed as a seat shaped of radially disposed ratchet teeth 93 and notches 94. The face of the hub opposite said seat will be provided with correspondingly shaped notches 87 and teeth 88. Both seats are normally pressed against each other by means of screw 95 provided at the head of pin 92 and nut 90.

A peripheral clearance 89 is provided between projection 95 and bore 86 of each sprocket 38 and 39 the purpose of which will be explained hereinafter.

Figure 7:
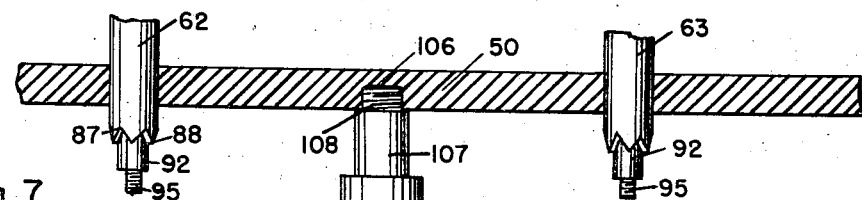
Figs. 7 and 8 illustrate respectively in plan view and elevational view an implement for holding and interchanging the elements of a couple of sprockets.
Figure 9:
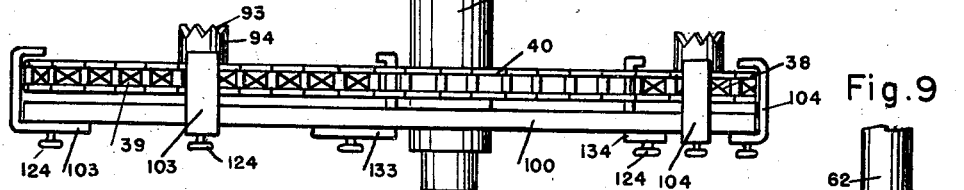
Fig. 9 is a section along line 9—9 of Fig. 8 of a detail of the implement.
Figure 8:
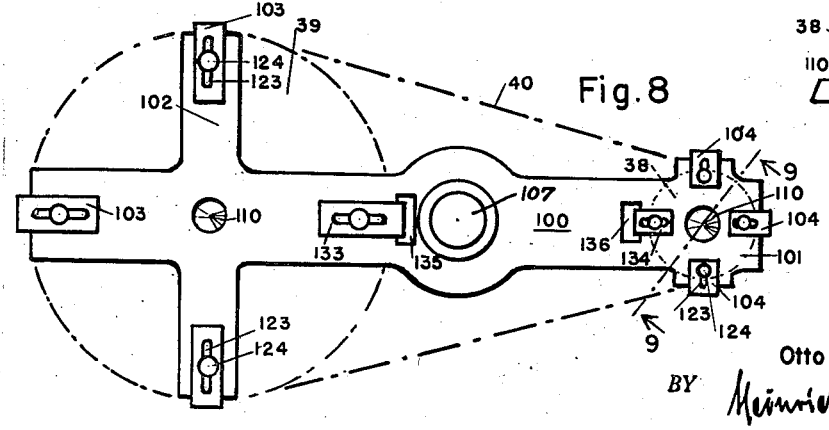

Figs. 7 to 9 illustrate an embodiment of an implement and the manner how it is employed for interchanging the position of a couple of sprockets with respect to their shafts.

This implement comprises a longitudinal bar 100 shaped at both of its ends as a cross, 101 and 102. The arms of the crosses are provided with clamps 103, 104 for clamping sprockets 38, 39 with their chain 40 to the implement. The clamps 133, 134 towards the middle of bar 100 may be inserted through openings 135, 136 respectively provided within bar 100. For setting the clamps they may be provided with slits 123 and clamp screws 124 or the like.

The base plate 50 is provided at the center distance between shafts 62 and 63 with a rest or socket 106 on or in which a pivot 107 may be seated, by means of a screw thread for instance, designated by 108. Implement 100 is provided with a sleeve 109 which embraces pivot 107. On the center of each of the crosses 101, 102 there is mounted, for instance by means of a screw thread 112, a cylindrical projection 110 illustrated in detail in Fig. 9.

These cylinder projections 110 of the implement are of equal diameter as the sprocket bores or sprocket shafts and are provided with ring-like extensions 113 adapted to be accommodated within the above described clearances 89 of the sprocket hubs 85 after the nuts 90 had been detached, as Fig. 9 illustrates.

By means of this implement the interchange of a pair of sprockets may be effected in an extremely simple way and rapidly.

After casing 44 had been removed, pivot 107 is screwed into socket 106. Nuts 90 are removed from shafts 62 and 63 and the implement is pushed by means of sleeve 109 on pivot 107. Extensions 113 of the cylindric projections 110 are pushed into the respective peripheral clearances 89 of the sprocket hubs 85. The sprockets which are now seated on the projections 110 may be withdrawn from the pins 92 and secured to the implement by means of clamps 103, 104, 133, and 134.

The implement is now rotated on pivot 107 about 180° until sprocket 39 and shaft 62, and sprocket 38 and shaft 63 are in juxtaposition. Sprockets 38 and 39 with the implement are shifted towards the base plate 50 until they are seated on the pins 92 of shafts 62 and 63, respectively. The clamps are loosened and the implement is withdrawn from pivot 107. The nuts 70 are replaced, pivot 107 is detached from base plate 50 and cover 44 is again secured to base plate 50. The same procedure is followed for the other side of the tractor.

Having now particularly described and ascertained the nature of my said invention and in what manner the same is to be performed, I declare what I claim is:

1. A tractor including in combination a frame, front and rear wheels and axles adapted to carry said frame in the front and in the rear thereof, an engine and a transmission mechanism carried by said frame, said transmission mechanism comprising a primary velocity stage including clutch, change speed gearing, propeller shaft and differential gear of suitable types, and a secondary stage including a drive axle adapted to be driven by said differential gear and located in front of said rear wheel axle and in spaced relation thereto, a secondary transmission arranged between, and in driven and driving connection respectively to, said drive axle and said rear wheel axle; said secondary transmission having removable and exchangeable transmission elements thereby being adapted for variable transmission ratio for alternatively supplying to said tractor high speed for travel and reducing the velocity of said tractor to slow speed for work, said removable and exchangeable transmission elements being disposed in front of said rear wheels outside of their perimeter whereby to make said transmission elements accessible, without detaching said rear wheels, for removal and exchange.

2. A tractor including in combination a frame, front and rear wheels and axles adapted to carry said frame in the front and in the rear thereof, an engine and a transmission mechanism carried by said frame, said transmission mechanism comprising a primary velocity stage including clutch, change speed gearing, propeller shaft and differential gear of suitable types, and a secondary stage including a drive axle adapted to be driven by said differential gear and located in front of said rear wheel axle and in spaced relation thereto, a secondary transmission arranged between, and in driven and driving connection respectively to, said drive axle and said rear wheel axle; said secondary transmission including removable and thereby exchangeable transmission elements directly accessible without removal of the rear wheels for supplying to said tractor speed ranges between high travel speed and slow tractor working speed.

3. A tractor including in combination a frame, front and rear wheels and axles adapted to carry said frame in the front and in the rear thereof, an engine and a transmission mechanism carried by said frame, said transmission mechanism comprising a primary velocity stage including clutch, change speed gearing, propeller shaft and differential gear of suitable types, and a secondary stage including a drive axle adapted to be driven by said differential gear and located in front of said rear wheel axle and in spaced relation thereto, a secondary transmission arranged between, and in driven and driving connection respectively to, said drive axle and said rear wheel axle; said secondary transmission including a pair of transmission elements directly accessible without removal of said rear wheels and adapted to be removed and interchanged one with the other for supplying two alternative transmission ratios, one for working speed, the other for high travel speed.

4. A tractor including in combination a frame, front and rear wheels and axles adapted to carry said frame in the front and in the rear thereof, springs inserted between said rear wheel axle and said frame, an engine and a transmission mechanism carried by said frame, said transmission mechanism comprising a primary velocity stage including clutch, change speed gearing, universal joint, propeller shaft, and differential gear of suitable types, and a secondary stage including a drive axle adapted to be driven by said differential gear and located in front of said rear axle and in spaced relation thereto, a secondary transmission arranged between, and in driven and driving connection respectively to, said drive axle and said rear wheel axle; said secondary transmission having transmission elements adapted to be removed and exchanged for obtaining a variable transmission ratio and alternatively supplying to said tractor high speed for travel and reducing the velocity of said tractor to low speed for work, said removable and exchangeable transmission elements being disposed in front of said rear wheels outside of their perimeter whereby to make said transmission elements accessible for removal and exchange without removal of said rear wheels.

5. A tractor as set forth in claim 4 wherein said frame includes a main cross member housing said universal joint, and a casing is provided for housing said rear wheel axle, said frame further including a tie generally of V-form, said tie being provided at its head and at its legs with ball pivots, said main cross member and said casing being adapted to mount thereat said ball pivots, respectively.

6. A tractor as set forth in claim 4 wherein said rear wheel axle comprises two shaft stubs, one for each wheel, and a coupling is associated with both said shaft stubs for arbitrarily coupling them together and thus locking said differential.

7. A tractor including in combination a frame, front and rear wheels and axles adapted to carry said frame in the front and in the rear thereof, an engine and a transmission mechanism carried by said frame, said transmission mechanism comprising a primary velocity stage including clutch, change speed gearing, propeller shaft and differential gear of suitable types, and a secondary stage including a drive axle adapted to be driven by said differential gear and located in front of said rear wheel axle and in spaced relation thereto, a secondary transmission arranged between, and in driven and driving connection respectively to, said drive axle and said rear wheel axle; said secondary transmission including a pair of shafts, a pair of sprockets having hubs adapted to be removably and interchangeably mounted on said shafts, said sprockets for supplying two alternative transmission ratios, one ratio for working speed, the other ratio for high travel speed, each of said shafts having a pin of lesser diameter than the shaft and axially extended therefrom, the step between said shaft and said pin providing a seat; each of said hubs having a bore corresponding to, and adapted to embrace, said pin; said seat on each of said shafts being shaped of radially disposed ratchet teeth and notches; a correspondingly shaped seat being provided at the face of each of said hubs opposite said shaft seat; clamping means being provided at the head of said pins for clamping the respective one of said sprockets seated on said pin against the seat of the respective one of said shafts.

8. A tractor including in combination a frame, front and rear wheels and axles adapted to carry said frame in the front and in the rear thereof, an engine and a transmission mechanism carried by said frame, said transmission mechanism comprising a primary velocity stage including clutch, change speed gearing, propeller shaft and differential gear of suitable types, and a secondary stage including a drive axle adapted to be driven by said differential gear and located in front of said rear wheel axle and in spaced relation thereto, a secondary transmission arranged between, and in driven and driving connection respectively to, said drive axle and said rear wheel axle; said secondary transmission including a pair of shafts, a pair of sprockets having hubs adapted to be removably and interchangeably mounted on said shafts, said sprockets for supplying two alternative transmission ratios, one ratio for working speed, the other ratio for travel speed; said tractor further including a base plate adapted to carry said pair of sprockets by means of said shafts, said base plate provided at the center distance between said shafts with a socket adapted to seat a pivot thereon for pivotally mounting an implement on said base plate, said implement adapted to grasp and carry thereon said sprockets when removed from their respective shafts and further adapted to be rotated about said pivot with said sprockets whereby to interchange the positions of said sprockets.

9. A tractor including in combination a frame, front and rear wheels and axles adapted to carry said frame in the front and in the rear thereof, an engine and a transmission mechanism carried by said frame, said transmission mechanism comprising a primary velocity stage including clutch, change speed gearing, propeller shaft and differential gear of suitable types, and a secondary stage including a drive axle adapted to be driven by said differential gear and located in front of said rear wheel axle and in spaced relation thereto, a secondary transmission arranged between, and in driven and driving connection respectively to, said drive axle and said rear wheel axle; said secondary transmission including a pair of shafts, a pair of sprockets having hubs adapted to be removably and interchangeably mounted on said shafts, said sprockets for supplying two alternative transmission ratios, one ratio for working speed, the other ratio for travel speed; each of said shafts having a pin of lesser diameter than the shaft and axially extended therefrom, the step between said shaft and said pin providing a seat, each of said hubs having a bore corresponding to, and adapted to embrace, said pin, a seat being provided at the face of each of said hubs and opposite said shaft seat and shaped in conformity therewith; said tractor further including a base plate adapted to carry said pair of sprockets by means of said shafts, said base plate provided at the center distance between said shafts with a socket adapted to seat a pivot thereon for pivotally mounting an implement on said base plate, said implement further having clamps and a pair of cylindric projections spaced apart a distance from each other equal to the distance of said shafts, each of said projections having an outer diameter corresponding to that of the bores of said sprockets, each of said projections further provided with a ring-like extension, a peripheral clearance provided between each of said hub bores and the head of said pins, each of said clearances each adapted to accommodate within its wall said ring-like extension, said implement thus adapted by means of said projections to carry thereon, and by means of said clamps to grasp, said sprockets when removed from their respective shafts; said implement further adapted to be rotated with said sprockets whereby to interchange the positions of said sprockets.

OTTO BERNHARD.